(12) United States Patent
Kordasiewicz et al.

(10) Patent No.: US 9,037,743 B2
(45) Date of Patent: May 19, 2015

(54) METHODS AND APPARATUS FOR PROVIDING A PRESENTATION QUALITY SIGNAL

(75) Inventors: Roman C. Kordasiewicz, Elmira (CA);
Anthony P. Joch, Waterloo (CA);
Michael D. Gallant, Kitchener (CA)

(73) Assignee: AVVASI INC., Waterloo (CA)

( * ) Notice: Subject to any disclaimer, the term of this patent is extended or adjusted under 35 U.S.C. 154(b) by 129 days.

(21) Appl. No.: 13/480,964

(22) Filed: May 25, 2012

(65) Prior Publication Data

US 2013/0318253 A1    Nov. 28, 2013

Related U.S. Application Data

(63) Continuation-in-part of application No. 13/191,629, filed on Jul. 27, 2011, which is a continuation-in-part of application No. 13/053,650, filed on Mar. 22, 2011, and a continuation-in-part of application No. 13/053,565, filed on Mar. 22, 2011, now Pat. No. 8,599,684.

(60) Provisional application No. 61/407,527, filed on Oct. 28, 2010, provisional application No. 61/407,531, filed on Oct. 28, 2010.

(51) Int. Cl.
*G06F 15/16*    (2006.01)
*H04N 17/00*    (2006.01)
*H04L 29/06*    (2006.01)

(52) U.S. Cl.
CPC .............. *H04N 17/004* (2013.01); *H04L 65/80* (2013.01); *H04L 65/605* (2013.01)

(58) Field of Classification Search
CPC ................ H04L 65/60; H04L 65/601–65/605; H04L 65/607; H04L 65/80

USPC .................. 709/205, 206, 231, 219
See application file for complete search history.

(56) References Cited

U.S. PATENT DOCUMENTS

| | | | |
|---|---|---|---|
| 6,847,395 B2 | 1/2005 | Thomas et al. | |
| 6,850,252 B1* | 2/2005 | Hoffberg | 715/716 |
| 7,398,543 B2* | 7/2008 | Cotarmanac'h et al. | 725/93 |
| 7,533,075 B1 | 5/2009 | Soferman et al. | |
| 7,647,614 B2 | 1/2010 | Krikorian et al. | |
| 2001/0009548 A1 | 7/2001 | Morris | |
| 2003/0046384 A1 | 3/2003 | Sirivara et al. | |
| 2003/0135631 A1* | 7/2003 | Li et al. | 709/231 |
| 2004/0034492 A1* | 2/2004 | Conway | 702/81 |

(Continued)

OTHER PUBLICATIONS

Document relating to International Application No. PCT/CA2013/000502 mailed Sep. 11, 2013 (International Search Report and Written Opinion).

(Continued)

*Primary Examiner* — Thu Ha Nguyen
(74) *Attorney, Agent, or Firm* — Bereskin & Parr LLP/S.E.N.C.R.L.,s.r.l.

(57) ABSTRACT

Apparatus, methods and systems using no-reference techniques for computing quality scores for audio and video components of a media session, where the quality scores are estimates of perceived quality by the viewer for the individual components of the media session. A presentation quality score is computed for a media stream by parsing a container of the media stream to determine media stream characteristics, estimating an visual quality factor and based on the visual quality factor, determining the presentation quality score.

20 Claims, 11 Drawing Sheets

(56) References Cited

U.S. PATENT DOCUMENTS

| | | | |
|---|---|---|---|
| 2004/0068746 | A1 | 4/2004 | Mori et al. |
| 2005/0063377 | A1 | 3/2005 | Bryant et al. |
| 2005/0089043 | A1 | 4/2005 | Seckin et al. |
| 2005/0123053 | A1* | 6/2005 | Cooper et al. ........... 375/240.24 |
| 2005/0204052 | A1 | 9/2005 | Wang et al. |
| 2007/0180106 | A1 | 8/2007 | Pirzada et al. |
| 2007/0220575 | A1 | 9/2007 | Cooper et al. |
| 2007/0245372 | A1 | 10/2007 | Yasuda |
| 2007/0261073 | A1 | 11/2007 | Blumenschien et al. |
| 2007/0271590 | A1 | 11/2007 | Gulas et al. |
| 2008/0002595 | A1 | 1/2008 | Rao |
| 2008/0155087 | A1 | 6/2008 | Blouin et al. |
| 2008/0159410 | A1 | 7/2008 | Perinkulam et al. |
| 2008/0195761 | A1 | 8/2008 | Jabri et al. |
| 2008/0250448 | A1 | 10/2008 | Rowe et al. |
| 2009/0019178 | A1 | 1/2009 | Melnyk et al. |
| 2009/0034426 | A1 | 2/2009 | Luft et al. |
| 2009/0043906 | A1 | 2/2009 | Hurst et al. |
| 2009/0210892 | A1 | 8/2009 | Ramaswamy |
| 2009/0234940 | A1* | 9/2009 | Pal et al. ........................ 709/224 |
| 2010/0008241 | A1 | 1/2010 | Gustafsson et al. |
| 2010/0053300 | A1* | 3/2010 | Einarsson et al. ......... 348/14.01 |
| 2010/0128130 | A1 | 5/2010 | Howcroft |
| 2010/0269044 | A1* | 10/2010 | Ivanyi et al. .................. 715/736 |
| 2011/0066703 | A1 | 3/2011 | Kaplan et al. |
| 2011/0194449 | A1 | 8/2011 | Connor |
| 2011/0228859 | A1 | 9/2011 | Sugimoto et al. |
| 2011/0265109 | A1 | 10/2011 | Goyet et al. |
| 2011/0296046 | A1 | 12/2011 | Arya et al. |
| 2012/0110167 | A1 | 5/2012 | Joch et al. |
| 2012/0117225 | A1 | 5/2012 | Kordasiewicz et al. |
| 2012/0259993 | A1* | 10/2012 | Eidelman et al. ............. 709/230 |
| 2013/0031575 | A1* | 1/2013 | Gallant et al. .................. 725/20 |
| 2013/0041988 | A1 | 2/2013 | Kordasiewicz et al. |
| 2013/0086279 | A1* | 4/2013 | Archer et al. ................. 709/233 |
| 2013/0293725 | A1* | 11/2013 | Zhang et al. .................. 348/180 |
| 2014/0181266 | A1* | 6/2014 | Joch et al. ..................... 709/219 |
| 2015/0026309 | A1* | 1/2015 | Radcliffe et al. ............. 709/219 |

OTHER PUBLICATIONS

Winkler et al., "The Evolution of video Quality Measurement", from PSNR to Hybrid Metrics. Published in Broadcasting, IEEE Transaction on. vol. 54, Issue 3, pp. 660-668, Sep. 2008.
Takahashi et al., Standardization Activities in the ITU for a QoE Assessment of IPTV. Published in Communications Magazine, IEEE, vol. 46, Issue 2, pp. 78-84, Feb. 2008.
Yamagishi et al., Parametric Packet-Layer Model for monitoring Video Quality of IPTV Services, Published in Communications, 2008, ICC '08, IEEE International Conference, pp. 110-114, May 23, 2008.
Brooks et al., "Delivering Quality of Experience: Why Being Objective and Quantitative is important", IEEE Network, p. 8-13, Apr. 2010.
Batteram et al., "Delivering Quality of Experience in Multimedia Networks", Bell Labs Technical Journal, vol. 15, No. 1, p. 175-193, Jun. 2010.
Anonymous, "Video Streaming Quality Measurement with VSQI", Technical Paper, May 14, 2009, 14 pages.
Document relating to U.S. Appl. No. 13/191,629, dated Dec. 7, 2013 (Office Action).
Document relating to U.S. Appl. No. 13/191,629, dated Oct. 3, 2013 (Preliminary Amendment).
Co-pending U.S. Appl. No. 13/053,650, "Delivery Quality of Experience (QoE) in a Computer Network", filed Mar. 22, 2011.
Document relating to U.S. Appl. No. 13/053,650, dated Oct. 4, 2012 (Office Action).
Document relating to U.S. Appl. No. 13/053,650, dated Jan. 4, 2013 (Office Action Response).
Document relating to U.S. Appl. No. 13/053,650, dated May 17, 2013 (Office Action).
Document relating to U.S. Appl. No. 13/053,650, dated Jun. 18, 2013 (Applicant Summary of Interview with Examiner).
Document relating to U.S. Appl. No. 13/053,650, dated Jun. 26, 2013 (Applicant Initiated Interview Summary).
Document relating to U.S. Appl. No. 13/053,650, dated Jul. 2, 2013 (Office Action Response).
Document relating to U.S. Appl. No. 13/053,650, dated Sep. 10, 2013 (Advisory Action).
Document relating to U.S. Appl. No. 13/053,650, dated Oct. 4, 2013 (RCE).
Document relating to U.S. Appl. No. 13/053,650, dated Nov. 8, 2013 (Office Action).
Co-pending U.S. Appl. No. 13/231,497, "Device With Video Buffer Modeling and Methods for Use Therewith", filed Sep. 13, 2011.
Document relating to U.S. Appl. No. 13/231,497, dated Mar. 29, 2013 (Office Action).
Document relating to U.S. Appl. No. 13/231,497, dated Jun. 12, 2013 (Office Action Response).
Document relating to U.S. Appl. No. 13/231,497, dated Oct. 10, 2013 (Office Action).
Document relating to U.S. Appl. No. 13/231,497, dated Nov. 18, 2013 (Office Action Response).
Document relating to U.S. Appl. No. 13/231,497, dated Dec. 3, 2013 (Advisory Action).
Document relating to U.S. Appl. No. 13/231,497, dated Dec. 16, 2013 (Response to Office Action and RCE).
Document relating to U.S. Appl. No. 13/231,497, dated Aug. 1, 2014 (Office Action).
Document relating to U.S. Appl. No. 13/231,497, dated Nov. 15, 2011 (Amendment).
Document relating to U.S. Appl. No. 13/231,497, dated Dec. 6, 2011 (Amendment).
Document relating to U.S. Appl. No. 13/053,650, dated Feb. 5, 2014 (Office Action Response).
Document relating to U.S. Appl. No. 13/053,650, dated May 23, 2014 (Office Action).
Co-pending U.S. Appl. No. 13/283,898, "Methods and Apparatus for Providing a Media Stream Quality Signal", filed Oct. 28, 2011.
Document relating to U.S. Appl. No. 13/283,898, dated Jun. 24, 2013 (Office Action ).
Document relating to U.S. Appl. No. 13/283,898, dated Oct. 24, 2013 (Office Action Response).
Jorgen Gustafsson et al. "Measuring Multimedia Quality in Mobile Networks with an Objective Parametric Model", ICIP 2008, 15th IEEE International Conference, Oct. 12, 2008, 4 pages.
Jorgen Gustafsson Ericsson Research et al. "P. NBAMS ToR; 379 (GEN/12)", International Telecommunication Union, Study Period 2009-2012, Sep. 17, 2010, 19 pages.
Pascal Hubbe et al., "An Innovation Tool for Measuring Video Streaming Qoe", Techzine, Jan. 12, 2011, 7 pages.
Xiangchun Tan et al. "Perceived Video Streaming Quality under Initial Buffering and Rebuffering Degradations", MESAQIN Conference 2006, Jun. 5, 2006, 8 pages.
Document relating to U.S. Appl. No. 13/053,650, dated Aug. 21, 2014 (Office Action Response).
Document relating to U.S. Appl. No. 13/283,898, dated Aug. 18, 2014 (Office Action).
Menkovski et al.; Measuring Quality of Experience on a Commercial Mobile TV Platform; IEEE; 2010 Second International Conferences on Advances in Multimedia; Jun. 13, 2013; pp. 33-38.
Yamagishi, et al.'Non-instrusive Packet-Layer Model for Monitoring Video Quality of IPTV Services; IEICE Transactions on Fundamentals of Electronics, Communications and Computer Sciences; Dec. 1, 2009; pp. 3297-3306' vol. E92A, No. 12; Engineering Sciences Society, Tokyo, JP.
Cuadra-Sanchez; End-to-End Quality of Service Monitoring in Convergent IPTV Platforms; IEEE; Third International Conferences on Advances in Multimedia Applications, Services and Technologies; Sep. 15, 2009; pp. 303-308.
Gustafsson et al. ("Non-Intrusive bitstream model for the assessment of performance of video streaming"; Sep. 17, 2010).
Document relating to U.S. Appl. No. 13/191,629, dated Aug. 7, 2014 (Office Action).

(56) References Cited

OTHER PUBLICATIONS

Document relating to U.S. Appl. No. 13/191,629, dated Jul. 1, 2014 (Applicant Summary of Examiner Interview).
Document relating to U.S. Appl. No. 13/191,629, dated Jun. 13, 2014 (Applicant Initiated Interview Summary).
Document relating to U.S. Appl. No. 13/191,629, dated Apr. 25, 2014 (Office Action Response).
Document relating to U.S. Appl. No. 13/191,629, dated Feb. 21, 2014 (Office Action).
Document relating to U.S. Appl. No. 13/191,629, dated Dec. 4, 2013 (Office Action Response and RCE).
Document relating to U.S. Appl. No. 13/191,629, dated Nov. 27, 2013 (Advisory Action).
Document relating to U.S. Appl. No. 13/191,629, dated Oct. 23, 2013 (Applicant Summary of Examiner Interview).
Document relating to U.S. Appl. No. 13/191,629, dated Oct. 16, 2013 (Office Action Response).
Document relating to U.S. Appl. No. 13/191,629, dated Sep. 13, 2013 (Office Action).
Document relating to U.S. Appl. No. 13/191,629, dated Jul. 19, 2013 (Office Action Response).
Document relating to U.S. Appl. No. 13/191,629, dated Apr. 22, 2013 (Office Action).
Document relating to U.S. Appl. No. 13/191,629, dated Apr. 10, 2013 (Office Action Response and RCE).
Document relating to U.S. Appl. No. 13/191,629, dated Mar. 12, 2013 (Office Action).
Document relating to U.S. Appl. No. 13/191,629, dated Jan. 30, 2013 (Office Action Response).

* cited by examiner

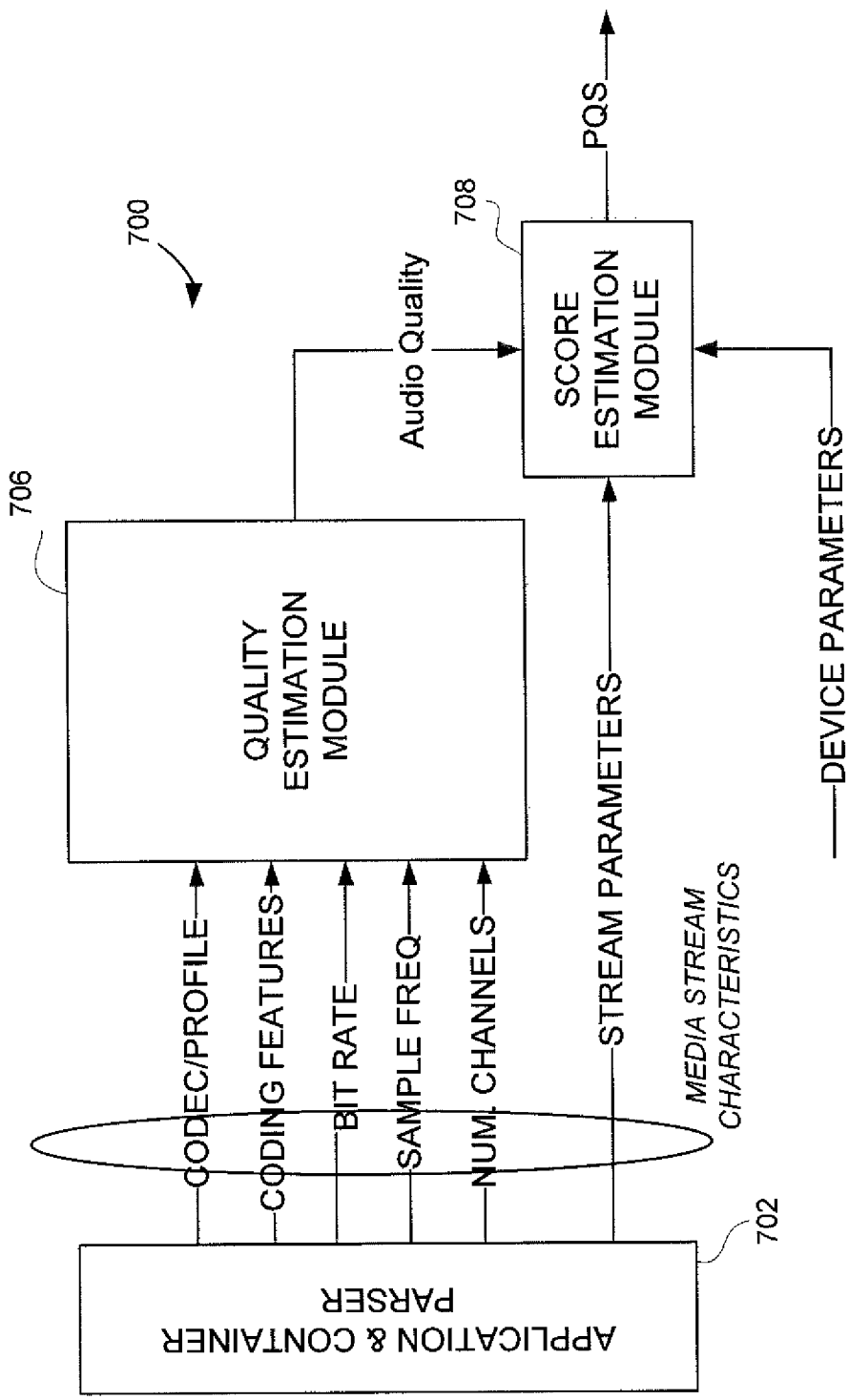

METHODS AND APPARATUS FOR PROVIDING A PRESENTATION QUALITY SIGNAL

CROSS-REFERENCE TO RELATED APPLICATIONS

This application is a continuation-in-part of U.S. patent application Ser. No. 13/191,629, filed Jul. 27, 2011, which is a continuation-in-part of U.S. patent application Ser. No. 13/053,565, filed Mar. 22, 2011, now issued as U.S. Pat. No. 8,599,684, which claims the benefit of U.S. Provisional Patent Application No. 61/407,527, filed Oct. 28, 2010; U.S. patent application Ser. No. 13/191,629 is also a continuation-in-part of Ser. No. 13/053,650, filed Mar. 22, 2011, which claims the benefit of U.S. Provisional Patent Application No. 61/407,531, filed Oct. 28, 2010.

FIELD

The described embodiments relate to network monitoring and particularly in conjunction with video distribution in mobile networks and other networks.

BACKGROUND

Streaming media sent over various computer networks is becoming increasingly popular. Maintaining such streaming is becoming a problem for the organizations providing and maintaining such networks. Streaming media has become an important element of the "Internet" experience through the significant availability of content from sites like YouTube™, Netflix™ and many others. Streaming media content imposes a significant load for the organizations that provide the networks for such content to be delivered. The companies that provide the networks, and also the content producers and distributors are limited in their ability to gauge the satisfaction of the end user. This is based in part, not only on the condition of the network, but the wide variety of different devices that can be used to access streaming media via a network.

SUMMARY

In a first aspect, there is provided a method of providing a presentation quality score for a media stream, the media stream transmitted in a media streaming session from a transmitting device to a receiving device. The method may comprise, prior to decoding the media stream, parsing a container of the media stream to determine at least one media stream characteristic; and determining the presentation quality score.

In some cases, the at least one media stream characteristic can be selected from the group consisting of a media stream bitrate, a video stream resolution and a video stream frame rate.

In some cases, the presentation quality score may be determined based on at least one device parameter. The at least one device parameter may be selected from the group consisting of a device display size, a device screen resolution and a device viewing distance.

The method may further comprise estimating a visual quality factor based on the at least one media stream characteristic, wherein the presentation quality score is determined based on the visual quality factor.

In some cases, the method may further comprise determining a representative quantization parameter for at least one frame of the media stream based on the at least one media stream characteristic. The representative quantization parameter may provide an estimate or approximation of the amount of visual distortion that is introduced by encoding a video, as described in further detail herein.

A mapping between the media stream bitrate and the representative quantization parameter can be determined qualitatively.

The visual quality factor can be estimated based on the representative quantization parameter.

At least one media stream characteristic can be selected from the group consisting of a media stream bitrate, a video stream resolution and a video stream frame rate.

Determining the presentation quality score may comprise normalizing the visual quality factor based on an encoding format of the media stream, wherein the normalizing is relative to a reference encoding format.

The method may further comprise parsing a video bitstream of the media stream to identify at least one intra frame, wherein the visual quality factor is estimated based on at least one intra frame coding parameter of the at least one intra frame. At least one intra frame coding parameter may be selected from the group consisting of macroblock mode, macroblock quantization parameter, coded macroblock size in bits, intra prediction mode, transform coefficient size, transform coefficient distribution and coded frame size.

In some cases, the method may further comprise decoding the at least one intra frame, wherein the visual quality factor is estimated based on the at least one decoded intra frame.

The method may further comprise parsing the video bitstream to identify at least one inter frame of the media stream, wherein the visual quality factor is estimated based on at least one inter frame coding parameter of the at least one inter frame. At least one inter frame coding parameter may be selected from the group consisting of macroblock mode, macroblock quantization parameter, coded macroblock size in bits, motion compensation mode, motion vector magnitude, transform coefficient size, transform coefficient distribution and coded frame size.

In some cases, the method may further comprise decoding the at least one inter frame, wherein the visual quality factor is estimated based on the at least one decoded inter frame.

The media stream may comprise an audio stream.

In some cases, the method may further comprise, prior to estimating the visual quality factor, selecting an analysis mode from a plurality of analysis modes.

The analysis mode may be selected based on whether the media stream is encrypted, based on a codec of the media stream or based on a computational load or based on business rules.

In a first analysis mode, a representative quantization parameter can be determined for at least one frame of the media stream based on the at least one media stream characteristic.

In a second analysis mode, which may also comprise the first analysis mode, a video bitstream of the media stream can be parsed to identify at least one intra frame.

In a third analysis mode, which may also comprise the first or second analysis mode, a video bitstream of the media stream can be parsed to identify at least one inter frame.

In a fourth analysis mode, which may comprise the second analysis mode and optionally the third analysis mode, the method may further comprise decoding the at least one intra frame.

In a fifth analysis mode, which may comprise the third analysis mode, and optionally the fourth analysis mode, the method may further comprise decoding the at least one inter frame.

In a second aspect, there is provided an apparatus for providing a presentation quality score for a media stream, the media stream transmitted in a media streaming session from a transmitting device to a receiving device. The apparatus may comprise a container parsing module and a score estimation module, and may be configured to carry out the described methods. In some cases, the apparatus may further comprise a quality estimation module.

BRIEF DESCRIPTION OF THE DRAWINGS

Preferred embodiments will now be described in detail with reference to the drawings, in which:

FIG. 11 is an exemplary block diagram of an audio PQS module.

DESCRIPTION OF EXEMPLARY EMBODIMENTS

Figure 1:
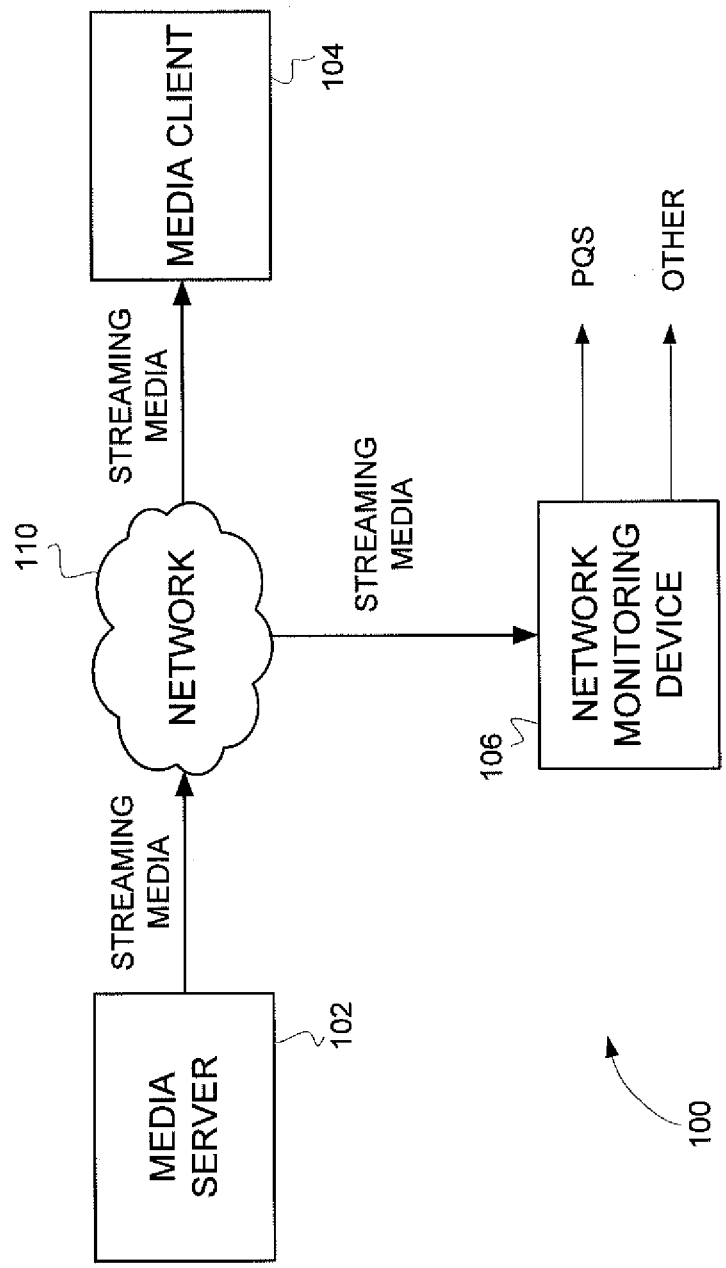
FIG. 1 is a diagram illustrating an exemplary media streaming system.

Many video and audio services show the potential to offer significant new revenue streams for content and broadband service providers. However, mobile and fixed broadband service providers face the challenge of satisfying subscriber expectations while managing the growing volume of data traffic on their networks. The inability or difficulty in measuring quality of experience (QoE) for video and audio data makes it difficult to assure video QoE. Accordingly, this impediment presents a major obstacle to rolling out revenue-generating video services. Moreover, adding visibility into video QoE is key to managing increasing amounts of subscriber churn due to consistently poor video QoE.

As over the top (OTT) video services, such as YouTube™ and Netflix™, have grown on mobile and fixed broadband networks, the technologies and solutions used to measure video quality have not developed sufficiently to provide an accurate and scalable means of determining the level of subscriber satisfaction when consuming this OTT video.

A commonly accepted approach to assessing media stream quality involves subjective experiments. Such experiments may be generally considered to represent the most accurate method for obtaining quality scores and ratings. In subjective video experiments, a number of viewers—typically 15 to 30—are asked to watch a set of clips and rate their quality. There are a wide variety of subjective testing methods and procedures, which will be appreciated by those skilled in the art. One common way to reflect the result of the experiment is by computing an average rating over all viewers. In some cases, additional data processing, including normalization and outlier removal, may be used. This average rating may be referred to as a Mean Opinion Score (MOS). One well-known application of MOS score principles is in the evaluation of voice call quality, based on various speech codecs and transmission parameters.

Quantifying a qualitative characteristic can be challenging because perception is individualistic and generally conveyed only as an opinion based on shared comparisons. Subjectivity and variability of viewer ratings can be difficult to completely eliminate. Accordingly, subjective experiments often attempt to minimize these factors with precise instructions, training and controlled environments. Nevertheless, a quality score remains defined by a statistical distribution rather than an exact measurement.

Objective quality metrics are algorithms designed to characterize the quality of video and to predict subjective quality or viewer MOS. There are a wide variety of objective quality metrics, developed by academic researchers and standardization bodies. These metrics may be generally categorized as full-reference, partial-reference, or no-reference, based on the amount of information required about a reference video (e.g., the source content).

Full-reference quality measurement techniques compare a post-encoded version of the video to a reference version of the video. The post-encoded version is typically the video as output from some system, which could be an encoder, transcoder, or other video processing system. The reference version may be, for example, the input to the system. Full-reference techniques typically operate in the spatial or pixel domain as opposed to the compressed domain. That is, the video content is decoded and rendered and the resulting, post-encoded video can be compared to the reference video on a pixel-by-pixel basis.

These measures are generally accurate at reflecting how closely the post-encoded video resembles the reference video. More complex methods may also attempt to detect common artifacts such as blocking, blurring, ringing and related artifacts.

Popular full-reference measures include PSNR, SSIM, VQM and PEVQ. These operate in the spatial domain, require access to the reference video, have high computational complexity, and are not easily automated outside a very controlled environment.

No-reference, also referred to as zero-reference, quality measurement techniques do not compare the post-encoded content to the reference content. Rather, no-reference techniques may estimate quality by analyzing only the post-encoded content, using algorithms and heuristics that are based on indicative encoding parameters and/or inferred encoding artifacts. No-reference approaches can be generally subdivided into two broad categories: a) bitstream-based techniques, which typically parse various headers and payloads to varying depths; and b) pixel-based techniques which fully decode the compressed video to generate a transformed or post-encoded video. Pixel-based techniques may exhibit better ability to detect and quantify encoding artifacts.

Generally, no-reference techniques are not as accurate as full-reference. However, they are generally less computationally complex and are therefore more scalable for deployment in a service provider network. As described herein further below, computational complexity can be traded off against accuracy by controlling the depth of parsing. Access to reference content is not a requirement. These techniques can be reasonably automated outside controlled environments.

The described embodiments may generally provide no-reference techniques for computing quality scores for audio and video components of a media session, where these quality scores are estimates of perceived quality by the viewer for the individual components of the media session. For example, the quality score may be a Presentation Quality Score (PQS), which can be a quality score that takes into account the impact of video encoding parameters and device-specific parameters on the user experience. Key performance indicators (KPIs) that can be used to compute the PQS may include codec type, resolution, bits per pixel, frame rate, device type, display size, and dots per inch. Additional KPIs may include coding parameters parsed from the bitstream, such as macroblock mode, macroblock quantization parameter, coded macroblock size in bits, intra prediction mode, motion compensation mode, motion vector magnitude, transform coefficient size, transform coefficient distribution and coded frame size. Other KPIs may also be used, as described herein. The PQS may be determined relative to a "best" viewing experience attainable on a specific device under ideal viewing conditions.

The PQS may be normalized for a wide variety of inputs including different streaming technologies, codecs, sampling rates, and playback devices.

The PQS may also be based, at least in part, on content complexity, as content complexity can be a factor in the visibility of impairments or artifacts due to the psycho-visual effects of the human visual system (e.g., a "masking" effect, whereby lower video quality in a fast-moving scene is less perceptible to the human visual system than in a slow-moving or still scene).

The PQS can be computed for the entirety of a media session, or computed periodically throughout a media session.

In some cases, the PQS can incorporate a memory model to account for recency effects. This is because, in subjective tests with longer form content, viewers may tend to place greater emphasis on the most recent part of the experience when asked to assess quality of the content in its entirety. That is, for the same impairment level, viewers may tend to penalize a media session more if the impairment occurs towards the end of the session rather than in the beginning. However, in some cases, the impact of recency effects may not be significant. Accordingly, it may not be necessary to model or mitigate such effects.

In some cases, the PQS can be adjusted based on a detected content type (e.g., movies, news, sports, music videos). Content type may be detected based on properties of the video (e.g., relatively little motion, frequency of intra frames, etc.) or metadata associated with the media session (e.g., site domain or URL).

In some cases, the described embodiments may be dynamically scalable in response to changing network or computational loads. Various analysis modes may trade off complexity and accuracy. Depending on the degree of accuracy desired, approximation, sampling and variability may be employed to increase capacity to analyze a high number of concurrent media sessions.

To quantify the presentation quality of a large and diverse amount of media sessions traversing a network link, PQS scores may be normalized based on playback device and media format.

In some cases, the described embodiments may be employed to quantify the effect of a media optimization system that alters media data as it traverses a network, for example, by transcoding. In addition, the described embodiments may enable the quantification of the quality of the various diverse Internet video sources (e.g., for quality assurance, monitoring or comparison), and subscriber satisfaction independent of network impairments.

Embodiments of the described systems, methods and apparatus may be used to compute a presentation quality score (PQS) for a media stream, where the media stream comprises encoded video, encoded audio or both. The PQS may provide a measure of the quality of a media session with respect to a display device, while minimizing or ignoring the impact of network conditions on the subscriber's QoE for the media session. Accordingly, the PQS may be used to estimate a level of viewer satisfaction with the quality of the media stream as presented on a display device (e.g., the viewer's receiving device). In some cases, the PQS may be normalized in some manner to account for various device profiles and codec differences.

PQS may be computed using a no-reference bit-stream or pixel-based techniques, or both, which may be used as an indicator of viewer satisfaction with the audiovisual quality of the media session. The described no-reference techniques have been tested with and correlated to numerous types of content and display devices, using a representative sample of viewers, to arrive at qualitatively determined PQS values. These qualitatively determined PQS values permit normalized and automatic measurement of subjective quality across a diversity of content and devices. The PQS values may be based on a MOS score of 1-5.

Computation of the PQS may take into account a variety of factors. Moreover, various network and device conditions, as well as business rules, may make it desirable to increase or reduce the complexity of the computation. Accordingly, the described embodiments facilitate scalable computation of PQS using one or more analysis modes. For example, in some modes, the accuracy of the PQS can be improved with a large amount of computation. Conversely, various lower-complexity modes can be used, which may decrease accuracy. This tradeoff between accuracy and complexity may be adjusted dynamically throughout one or more media sessions.

Referring to FIG. 1, a block diagram of an exemplary system 100 is shown. The system 100 illustrates an example of a high level overview of an implementation of an embodiment. The system 100 generally comprises a transmitting device or media server 102, a receiving device or media client 104 and a network monitoring device 106. The media server 102 may present media content (e.g., a media stream in a streaming media session) through a network 110. The network 110 may be implemented as a delivery network comprising numerous complex and/or interconnected hardware and/or software systems through which streaming media travels. The media stream may be presented to both the media client 104 and the network monitoring device 106. QoE estimation may be implemented in the network monitoring device 106 as media sessions traversing the network 110 are monitored. The monitoring device 106 may be implemented in hardware, software or a combination of hardware and/or software. In one example, the monitoring device 106 may monitor traffic in Internet Protocol (IP) networks. However, the particular type of network may be varied to meet the design criteria of a particular implementation. While the monitoring device 106 is shown connected to the network 110, the monitoring device 106 may also be connected directly at the media server 102 or the media client 104.

The monitoring device 106 may inspect all packets on network interfaces being monitored. The monitoring device 106 may look for media sessions on the network 110. Once a media session is detected, monitoring device 106 may compute a PQS for the media session as described herein.

Although monitoring device 106 is shown in FIG. 1 as an external monitoring device, in some cases monitoring device 106 may be incorporated into an "in-line" device between media server 102 and media client 104. For example, monitoring device 106 may be a router or deep-packet inspection device, or a module incorporated into a router or deep-packet inspection device.

In some embodiments, monitoring device 106 may compute one or more additional quality metrics. For example, the state of the media client 104 may be generally estimated for the purpose of QoE estimation. The state information can be based on how and when a particular session is started and how the media is delivered over the network 110. The state information may then be used to either compute an estimate of a delivery quality score (DQS), which may be mapped to a set of levels that are subjectively determined, or a network quality score (NQS), which may be based on a set of objective factors. The state information and intermediate signals may also be analyzed and reported directly to generate a report of key performance indicators (KPIs) for video streaming on the network. Examples of statistics that may be reported include the number, frequency and duration of re-buffering events, buffer fullness measures (such as average, minimum and maximum values over various intervals), and durations of video downloaded/streamed and played/watched. In cases where adaptive bitrate streaming is used, key performance indicators may also include a number of stream switch events, a location in the media stream, a duration of the stream switch event, and a change in operating point for the stream switch event. Further details relating to the computation of such metrics may be found, for example, in co-pending U.S. patent application Ser. No. 13/283,898, the entirety of which is incorporated herein by reference.

Figure 2:
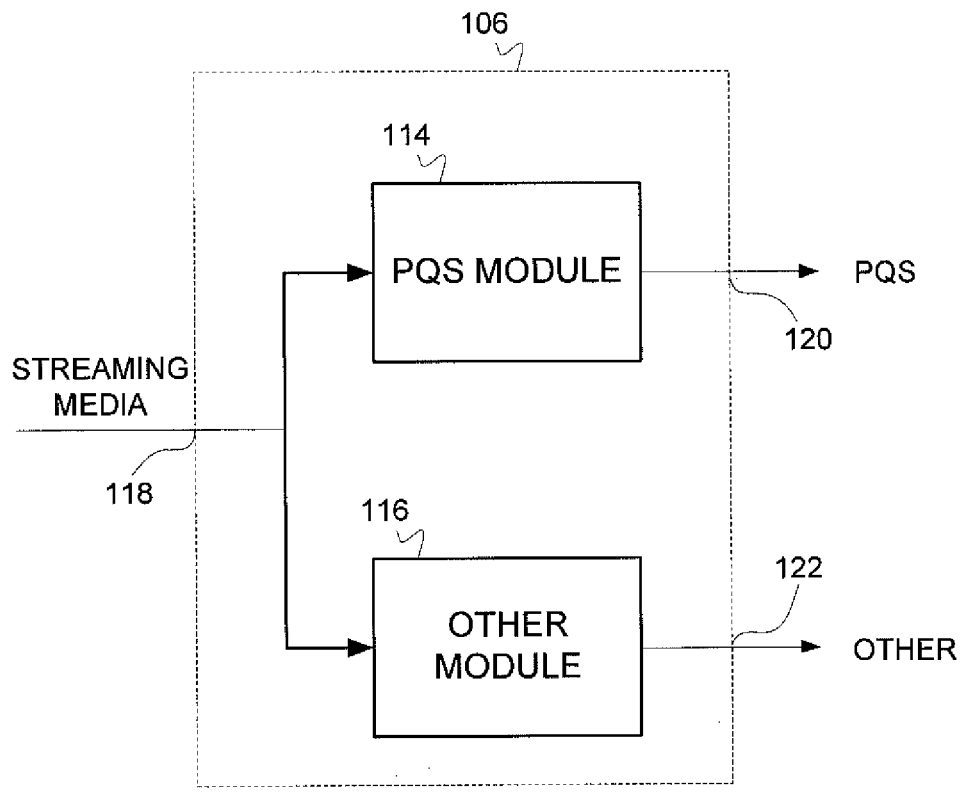
FIG. 2 is a simplified block diagram of an exemplary monitoring device.

Referring to FIG. 2, a simplified block diagram of the device 106 is shown. The device 106 generally comprises a PQS computation module 114, and an additional computation module 116. The device 106 may have an input 118 that may receive the media stream data, an output 120 that may present the computed PQS and an output 122 that may present the other quality metrics. The PQS may be in a first format (e.g., a MOS range of 1 to 5), while the other metrics may be in the first format, or also in a second format (e.g., a percentage). The device 106 may generate the PQS and the other metrics based on, or in response to, the media stream data. The monitoring device may generate the PQS individually, the other metrics individually, or a combination of the PQS and other metrics. The PQS may be considered as a value expressing quality of experience while discounting the impact of the delivery network on the end user quality of experience. That is, the delivery network may be assumed to be perfect for the purposes of computing PQS.

Figure 3:
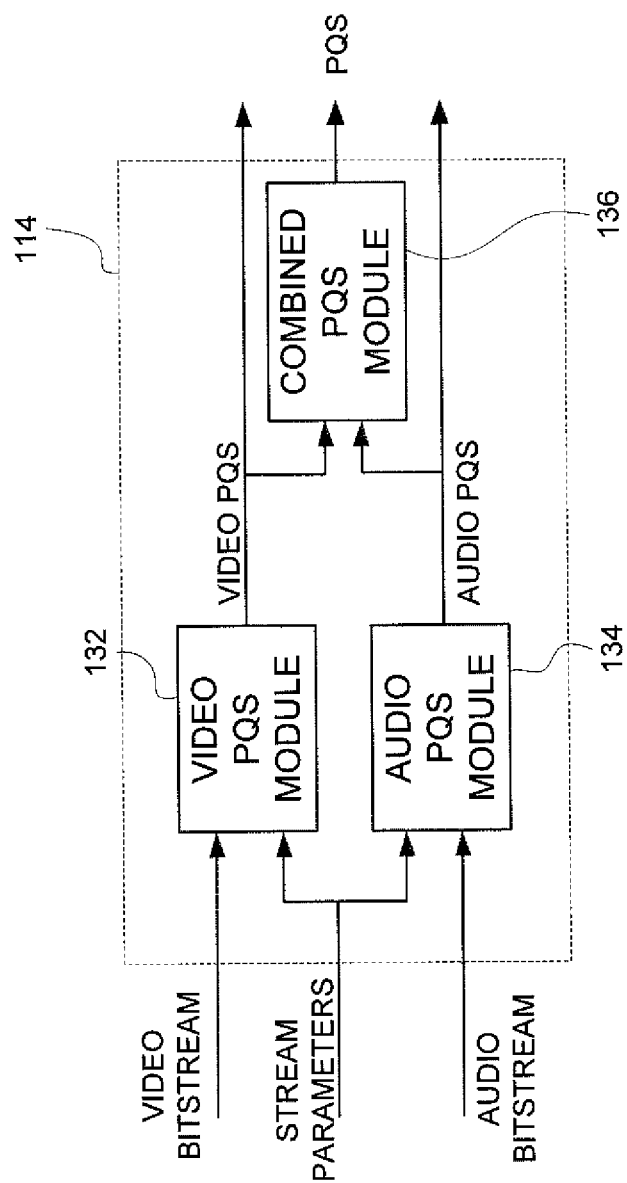
FIG. 3 is a simplified block diagram of an exemplary PQS module.

Referring now to FIG. 3, there is shown a simplified block diagram of an exemplary PQS module 114.

PQS module 114 may comprise a video PQS module 132, an audio PQS module 134 and a combined PQS module 136. Combining independent audio and video PQS may be performed to simplify design of the individual modules 132 and 134. However, in some embodiments, one or more of the module 132, 134 and 136 may be omitted. For example, in an audio-only PQS module 114, video PQS module 132 and combined PQS module 136 may be omitted.

Combined PQS module 136 may combine audio PQS and video PQS into a single PQS for the media session, where the overall PQS is an estimate of perceived quality by the viewer for the overall media session.

PQS module 114 may receive an input bitstream and one or more stream parameters. In some cases, the one or more stream parameters may be determined by parsing the input bitstream.

The input bitstream can be parsed by video PQS module 132 to identify media stream characteristics. These may comprise parameters and characteristics that may be generally grouped into several categories: data extracted or determined from a video bitstream of the media stream without parsing into the macroblock layer, data extracted or determined from a video bitstream by parsing (decoding) the macroblock layer, and data extracted or determined by performing motion compensation, inverse quantization and transformation, and reconstruction.

Media stream characteristics that can be determined without parsing into the macroblock layer include data and metadata that can be determined from the container layer of the media stream, such as sequence headers, picture headers and slice headers. For example, these characteristics may include a video resolution (width and height), a video frame rate, a video codec & profile, indicators of optional coding features that are signaled in the highest layers of codec syntax (e.g. entropy coding modes, deblocking filter, a video bit rate (which may be determined over varying intervals, including frame, group of frames, and sequence), a coded picture type (e.g., intra frame, inter frame, bi-predicted, etc.), bits per frame, and the like.

Media stream characteristics that can be determined by parsing into the macroblock layer and decoding the bitstream, include a coefficient quantizer step size or actual quantization parameter (QP) (e.g., for each macroblock), coded motion vector difference and reconstructed motion vectors, macroblock and block prediction modes (for both intra coded and inter coded macroblocks), bits per macroblock, coded block pattern values, coded transform coefficients (size, number, distribution and value), coded frame size and the like.

Media stream characteristics that can be determined by performing motion compensation, inverse quantization and transformation, and reconstruction include a residual image and a fully reconstructed image.

The input bitstream can be parsed by audio PQS module 134 to identify additional media stream characteristics relating to audio parameters. These may comprise parameters and characteristics such as audio sampling rate, number of channels, audio codec and profile and audio bit rate.

In some cases, a dedicated parsing module (not shown) may be provided to perform parsing of the input bitstream into its video and audio components.

Stream parameters and characteristics may include site-specific and device-specific parameters and characteristics. Examples of device-specific parameters include a playback device screen size, a playback device type (e.g., personal computer, tablet, smartphone, set-top box, etc.), a device screen resolution, and the like. Examples of site-specific parameters include a site name, a site address (e.g., domain), a site request URL, a content type, a content genre, and the like.

In some cases, a region of interest indicator may also be provided, for indicating a part of a frame (e.g., window) to be processed.

As network and computational load can vary widely in practice, it may be desirable to operate in a reduced-complexity mode during periods of peak load so that all media streams can be analyzed to provide a PQS. At off-peak times, the accuracy of the estimates may be enhanced.

If a large number of concurrent media streaming sessions are analyzed, aggregate statistical properties can be exploited to increase the number of sessions that are processed at once. In particular, subsets of the concurrent sessions can be analyzed at varying levels of complexity and the results extrapolated or generalized. With a large number of concurrent sessions, it may not be necessary to operate in the most complex mode of analysis in order to compute an accurate quality estimate.

In some cases, it may be desirable to ensure a level of accuracy for certain media streaming sessions (e.g., for business purposes, for more popular content, etc.). In such cases accuracy of PQS may be refined over a plurality of media streaming sessions for the same item of media content. That is, the PQS and associated data (e.g., complexity mode, sampling points previously used, etc.) may be stored and the score refined each time the media stream is transmitted (and viewed), for example, by increasing complexity mode, by sampling different portions of the media stream, or otherwise.

Figure 4:
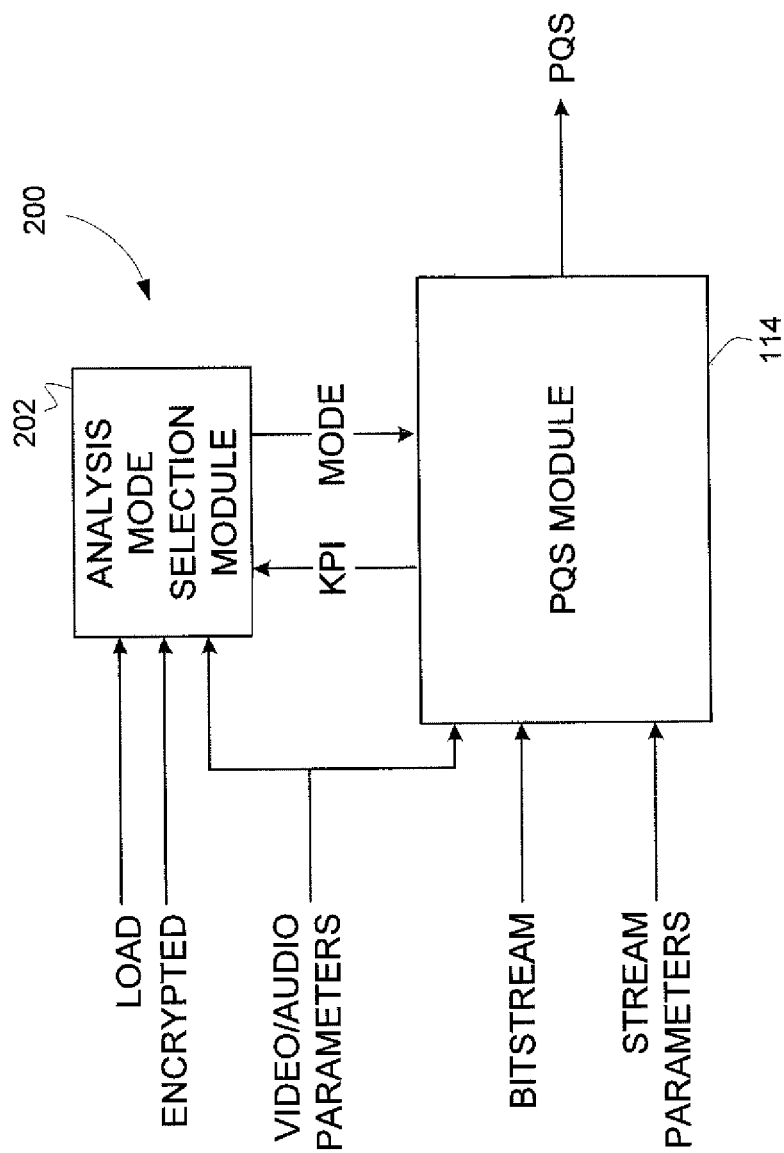
FIG. 4 is an exemplary simplified PQS apparatus.

Referring now to FIG. 4, there is shown an exemplary simplified PQS apparatus 200. PQS apparatus 200 comprises a PQS module 114 and an analysis mode selection module 202.

Analysis mode selection module 202 receives a plurality of inputs, such as a CPU or network load indication, video or audio parameters of the media stream and an indication of whether the bitstream is encrypted, for example with Digital Rights Management (DRM). Based on the plurality of inputs, analysis mode selection module 202 may select a complexity level for PQS module 114 to use when analyzing the bitstream of a media stream. Accordingly, PQS module 114 may be dynamically configured to use the appropriate analysis mode.

Selection of an analysis mode may be dependent upon a number of factors. For example, if the bitstream is encrypted, it may not be possible to access data and so a low complexity mode can be used. The low complexity mode may rely on container-level parameters, as the container itself may not be encrypted.

Similarly, if a CPU load or a network load is high, a low complexity mode can be used until the load decreases. For example, CPU load may depend on the encoding complexity of the media streams being processed.

In some cases, the selection of an analysis mode may depend on the ability to improve accuracy given a certain level of information. For example, analysis mode selection module 202 may determine in some cases that increasing the complexity of the analysis is unlikely to change or improve the accuracy of the estimate. Accordingly, the lower complexity mode may continue to be used for a media streaming session.

Analysis mode selection module 202 can dynamically determine an analysis mode based on the inputs (e.g., load, video and audio parameters, etc.), and transmit an indication of the analysis mode to be used by PQS module 114.

In general, analysis mode selection module 202 determines whether to perform shallower or deeper analysis based on system resource availability (e.g., CPU and network load), as well as results of the analysis of the media session up to the current point in time. Deeper, more complex analysis may be performed only as necessary and when there are sufficient system resources. Even within a current analysis mode, decisions may include: restricting analysis based on frame types (e.g. only parsing/analyzing intra frames), sampling of frames (e.g. performing some parsing/analysis for some subset of the frames of a certain type), sampling of frame regions (e.g. considering only a region of interest (ROI), or exiting the parsing/analysis part-way through a frame, once it is estimated that sufficient information has been extracted), and restricting analysis based on similarity to previous sessions (e.g., if a media session is similar to a previous media session, further analysis may be aborted or restricted).

In some cases, PQS module 114 may transmit key performance indicators (e.g., KPIs as described herein) related to the bitstream to analysis mode selection module 202, for use in determining the analysis mode.

Figure 5:
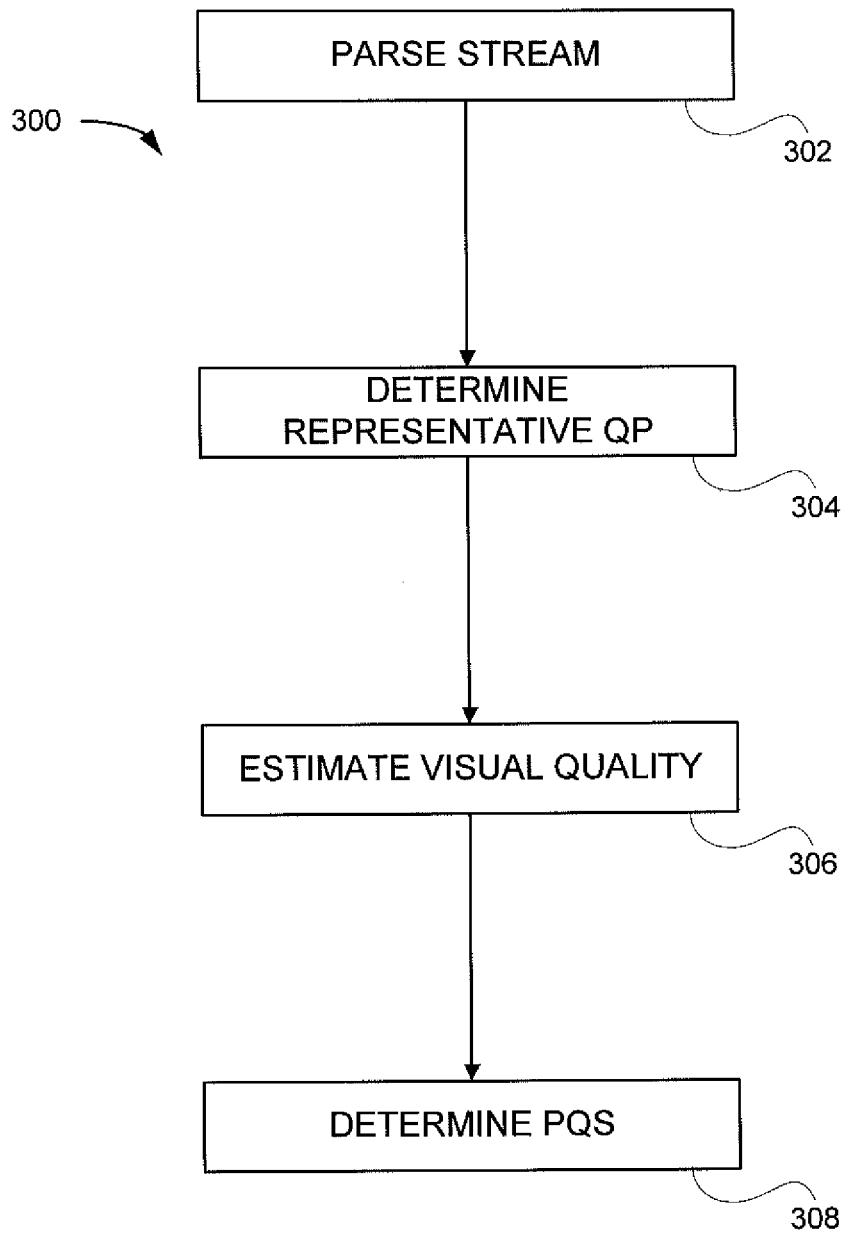
FIG. 5 is an exemplary PQS computation process flow chart.

Referring now to FIG. 5, there is shown an exemplary PQS computation process flow 300, which may be carried out by PQS module 114.

At 302, a media stream is received and parsed. Depending on the complexity level of the current analysis mode, the bitstream may further be decoded and rendered to generate post-encoded content. In a first, low complexity mode, the media stream may only be parsed at the container level. In a higher complexity mode, the media stream may additionally be parsed into the macroblock layer and optionally decoded. In a still higher complexity mode, the media stream may be decoded and rendered to generate frame data for analysis.

Depending on the analysis mode, various types of video frames may be parsed or decoded. For example, in a medium complexity mode, intra frames (e.g., I frames) may be parsed or decoded but inter frames (e.g., B and P frames) may not.

At 304, a representative quality parameter (QP) can be determined.

In a first, low complexity mode, the representative QP may be estimated based on information that is identified at the container level or above (e.g., codec, raw data rate). This is because the bitstream itself is not parsed into the macroblock layer or decoded to allow for direct determination of the QP from the bitstream. In higher complexity modes, a representative or actual QP may be determined directly from an actual quantization parameter extracted from the bitstream, as described herein.

At 306, an estimate of visual quality may be determined based on a plurality of factors, including the representative QP, media stream characteristics, fundamental sampling parameters (e.g., resolution, frame rate, etc.), estimates of the amount of artifacts introduced by lossy compression process, and the visibility/masking of said artifacts.

At 308, the PQS for the media stream may be determined based on the estimated visual quality. Optionally, the PQS may be adjusted based on a normalization factor to account for client device and codec differences, as described herein.

Figure 6:
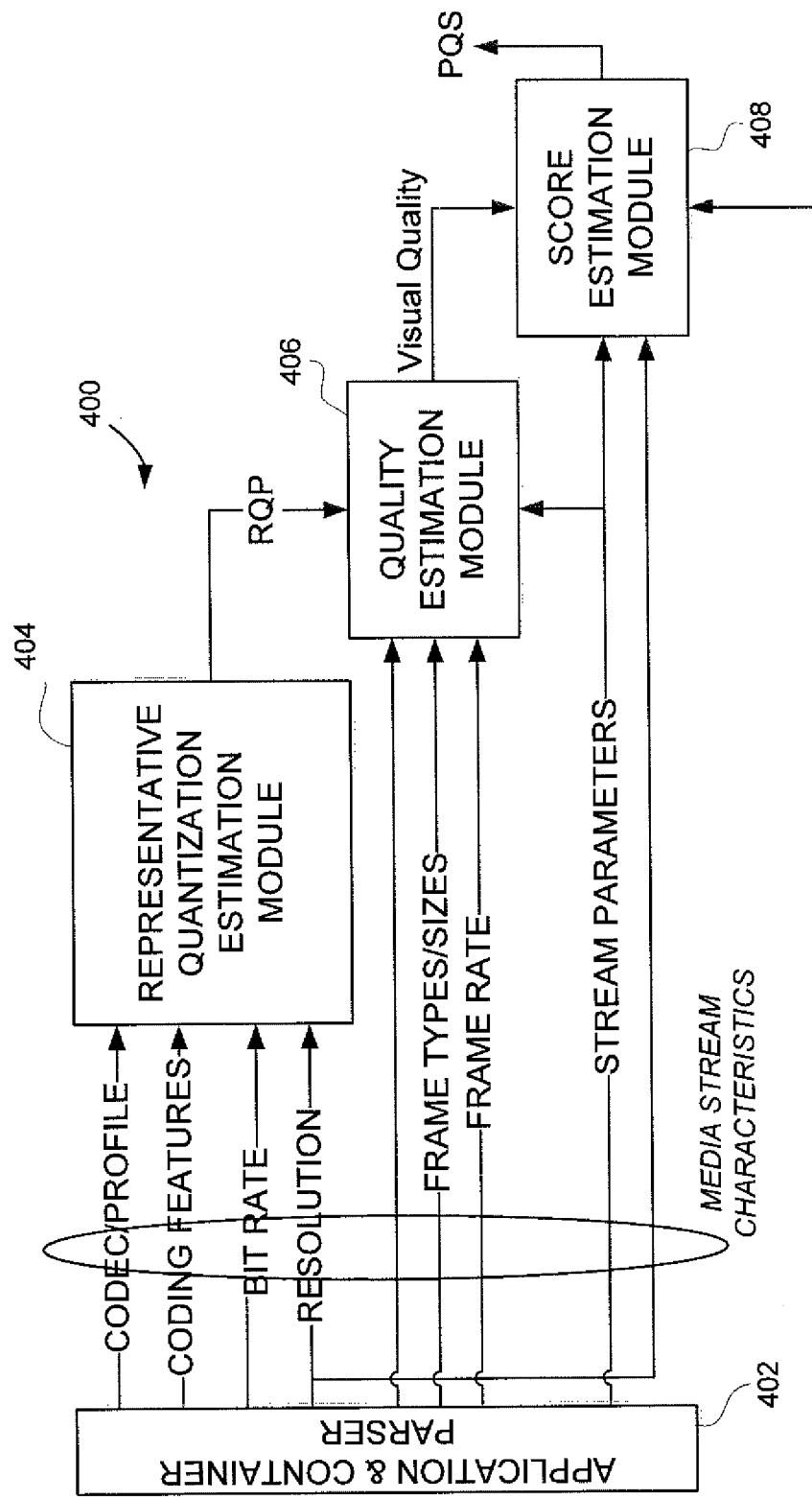
FIG. 6 is an exemplary block diagram of a PQS module operating in a first, low-complexity analysis mode.

Referring now to FIG. 6, there is shown an exemplary block diagram of a PQS module 300 operating in a first, low-complexity analysis mode.

A low complexity analysis mode may be needed, for example, if the content of a media stream (i.e., elementary stream) is DRM protected or encoded using an unsupported codec/format, or if computational or network load forces selection of the low complexity analysis mode.

PQS module 400 is generally analogous to video PQS module 132 of PQS module 114, and comprises an application and container parsing module 402, a representative quantization estimation module 404, a quality estimation module 406 and a score estimation module 408.

Application and container parsing module 402 generally does not parse into the macroblock layer, and instead parses the application layer and the media container of a media stream.

Accordingly, application and container parsing module 402 can determine media stream characteristics such as a video resolution (width and height), a video frame rate, a video codec & profile, indicators of optional coding features that are signaled in the highest layers of codec syntax (e.g., entropy coding modes, use of deblocking filter, etc.), a video bit rate (which may be determined over varying intervals, including frame, group of frames, and sequence), a coded picture type (e.g., intra frame, inter frame, bi-predicted, etc.), bits per frame, and the like.

Application and container parsing module 402 may also determine, or receive as input, one or more stream parameters.

Application and container parsing module 402 can output the determined media stream characteristics to quantization module 404. The media stream characteristics may include characteristics such as codec and profile, coding features, video bit rate and video resolution.

Representative quantization estimation module 404 computes a representative QP based on the media stream characteristics.

In low complexity modes, representative quantization estimation module 404 may compute the representative QP.

To compute the representative QP, representative quantization estimation module 404 may first estimate the number of bits per macroblock. In some cases, the estimate may be based on an average macroblock size (e.g., 16×16 pixels), the video resolution and other video characteristics.

Optionally, for example if an unknown or unsupported codec is used, the number of bits per macroblock may be adjusted, or normalized, to correspond to a reference codec (e.g., H.264), based on a coarse scaling factor. For example, if the MPEG-2 video codec is unsupported, but it is known that MPEG-2 generally requires G more bits (where G is a ratio or percentage) per macroblock than H.264 to achieve a corresponding quality level, then the estimated number of bits may be adjusted accordingly.

Next, a number of macroblocks per frame may be estimated for the media stream. The estimated number of macroblocks may be based on a standard or average size macroblock (e.g., 16×16 pixels). Accordingly, for a known video resolution, the number of macroblocks per frame can be determined according to EQ1:

$$W \times H/M, \quad \text{EQ1:}$$

where W is the width of the video in pixels, H is the height of the video in pixels and M is the macroblock size in square pixels.

Accordingly, for a video resolution of 1280×720 pixels and a macroblock size of 256, the number of macroblocks per frame is 3600. Similarly, for a video resolution of 160×160 pixels and a macroblock size of 256, the number of macroblocks per frame is 100.

Based on the estimated number of bits/macroblock, and the number of macroblocks per frame, the representative QP may be determined with reference to a mapping table, such as Table 1, for H.264 Baseline Profile.

TABLE 1

| RQP (est.) | Bits/Macroblock | | | | |
| --- | --- | --- | --- | --- | --- |
| 1  | 1308 | 1268 | 1267 | 1310 | 1380 |
| 5  | 1050 | 1001 |  999 | 1045 | 1123 |
| 9  |  764 |  700 |  714 |  762 |  852 |
| 13 |  504 |  433 |  478 |  530 |  622 |
| 17 |  261 |  218 |  303 |  348 |  425 |
| 21 |  121 |  124 |  195 |  227 |  284 |
| 25 |   64 |   75 |  121 |  142 |  177 |
| 29 |   37 |   45 |   72 |   83 |  101 |
| 33 |   23 |   28 |   43 |   49 |   57 |
| 37 |   15 |   17 |   25 |   28 |   31 |
| 41 |    9 |   10 |   13 |   14 |   15 |

TABLE 1-continued

| RQP (est.) | Bits/Macroblock | | | | |
| --- | --- | --- | --- | --- | --- |
| 45 | 6 | 6 | 8 | 8 | 8 |
| 49 | 4 | 4 | 4 | 4 | 4 |
| Macroblocks/Frame | 8100 | 3600 | 680 | 340 | 100 |

Representative quantization estimation module 404 identifies the appropriate column corresponding to the number of macroblocks per frame and then identifies the nearest match to the estimated number of bits per macroblock. Based on this, the estimated representative QP can be determined.

For example, using Table 1, for a 1280×720 frame, with an estimated number of bits per macroblock of 75, the representative QP will be 25.

If an exact match cannot be found, data in the table may be interpolated, rounded to the nearest match, or otherwise fitted.

In general, content encoded with a representative QP in the range of 1 to 17 may be considered to be "pristine", 21 to 33 may be considered "good" and 37 to 49 may be considered "bad".

In general, a higher number of bits per macroblock corresponds to a lower QP. However, as shown in Table 1, as video resolution decreases, the number of bits per macroblock required to maintain a particular QP value increases. This is because a greater number of bits is required to represent the additional complexity in each macroblock.

Once the representative QP is determined, it is provided to quality estimation module 406, along with stream parameters and some video parameters such as frame rate. Quality estimation module 406 computes an estimated quality based on the stream parameters, video parameters and representative QP. In general, a higher frame rate tends to improve QoE, as the perception of natural, continuous motion is improved, accordingly, a higher frame rate may correspond to an improved estimated quality.

Finally, score estimation module 408 may compute a PQS based on the estimated visual quality and, optionally, stream parameters and device parameters. Device parameters generally comprise information about the viewing experience provided by the device that will be used to playback the stream, such as a physical size of the device display (e.g., 4" diagonal, 15" diagonal, etc.), screen resolution (e.g., as measured in pixels per inch), expected or typical viewing distance (e.g., for a smartphone, the typical viewing distance may be 16 inches, whereas for a laptop computer, the typical viewing distance may be 32 inches). In general, a larger display size, higher screen resolution and closer viewing distance are factors that may correspond to lower QoE (and vice versa), as these generally facilitate the display and perception of more detail by a viewer. For example, for a constant screen resolution and viewing distance, display of the same video stream on progressively higher display sizes may correspond with progressively decreased QoE, as artifacts become more visible. Likewise, for constant screen resolution and display size, changing the viewing distance to progressively closer distance may correspond with similarly decreased QoE.

Figure 7:
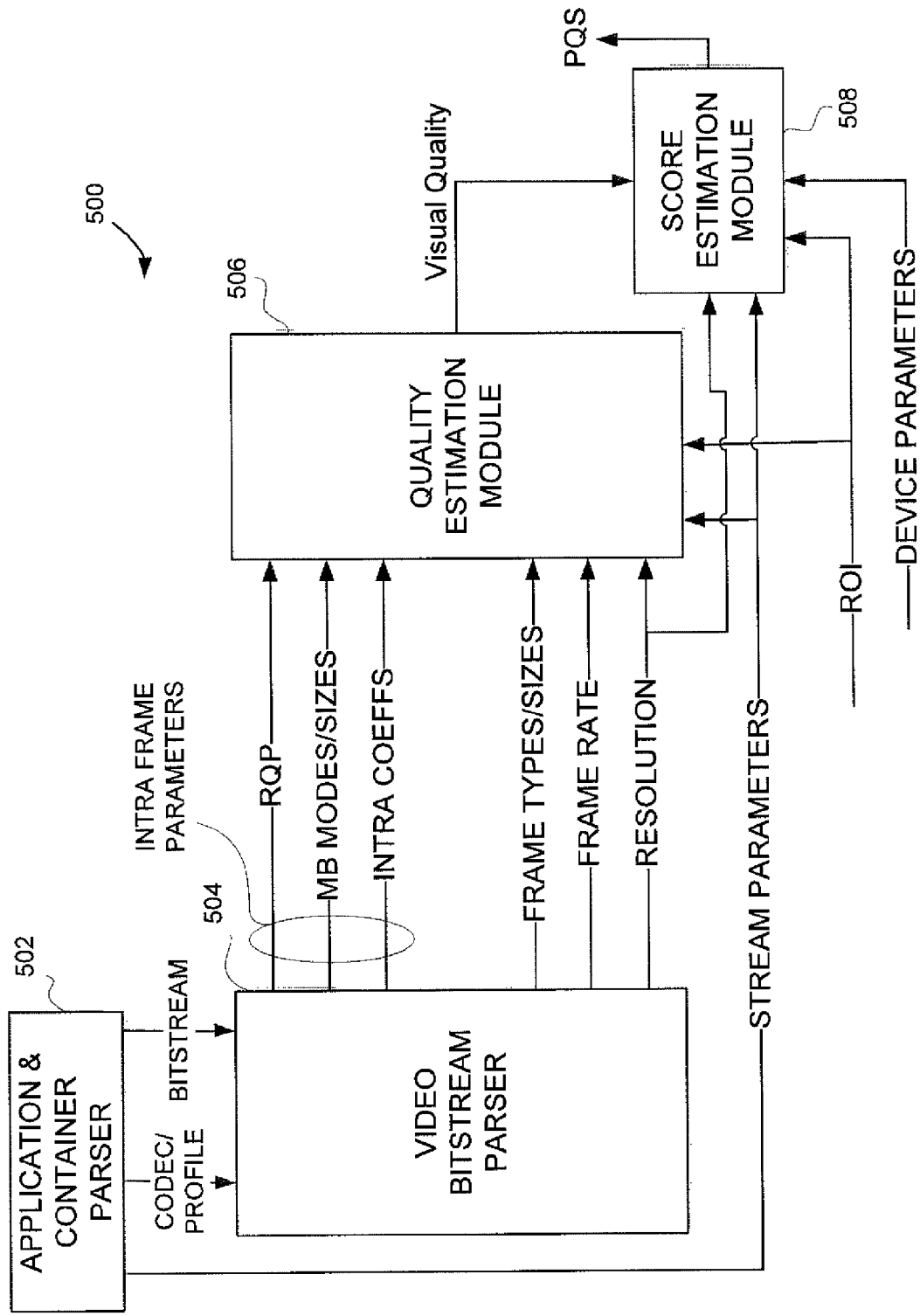
FIG. 7 is an exemplary block diagram of a PQS module operating in a second, medium-complexity analysis mode.

Referring now to FIG. 7, there is shown an exemplary block diagram of a PQS module 500 operating in a second, medium-complexity analysis mode.

A medium complexity analysis mode may be used, for example, if the content of a media stream can be decoded, or if computational or network load enable selection of the medium complexity analysis mode. In some embodiments, the second analysis mode may comprise some or all of the first analysis mode.

PQS module 500 is generally analogous to video PQS module 132 of PQS module 114, and comprises an application and container parsing module 502, a video bitstream parsing module 504, a quality estimation module 506 and a score estimation module 508.

Accordingly, application and container parsing module 502 can determine similar characteristics as application and container parsing module 402, such as a video resolution (width and height), a video frame rate, a video codec & profile, indicators of optional coding features that are signaled in the highest layers of codec syntax (e.g., entropy coding modes, use of deblocking filter, etc.), a video bit rate (which may be determined over varying intervals, including frame, group of frames, and sequence), a coded picture type (e.g., intra frame, inter frame, bi-predicted, etc.), bits per frame, and the like.

In some embodiments, application and container parsing module 502 may not determine some of the above characteristics, which may instead be determined by video bitstream parsing module 504.

Application and container parsing module 502 may also determine, or receive as input, one or more stream parameters.

Application and container parsing module 502 may output an elementary stream to video bitstream parsing module 504. In addition, application and container parsing module 502 may output stream parameters and video characteristics, such as codec and profile, to video bitstream parsing module 504.

Video bitstream parsing module 504 retrieves intra frames (I frames) embedded within the elementary stream and parses the intra frames to determine one or more intra frame coding parameters. Examples of intra frame coding parameters include one or more coefficient quantizer step size or actual quantization parameter (QP) used with the intra frame, a macroblock mode, an intra frame prediction mode, number of bits per macroblock, coded block pattern values and coded transform coefficients (e.g., number and value). The one or more actual coding parameters may be averaged or otherwise combined to provide a representative QP for the intra frame.

In some variant embodiments, the function of application and container parsing module 502 and video bitstream parsing module 504 may be merged in whole or in part. Accordingly, application and container parsing module 502 may also be capable of parsing into the macroblock layer, in addition to the application layer and the media container of a media stream.

Quality estimation module 506 receives the representative QP and intra frame coding parameters from video bitstream parsing module 504 and uses the representative QP and intra frame coding parameters to estimate a visual quality of the intra frame. Because each intra frame can be analyzed at the macroblock level, video bitstream parsing module 504 can use the actual QP values for each macroblock in an intra frame and determine the number of bits per macroblock, thus enabling a more accurate measure of the quality of an intra frame.

In some embodiments, the representative QP may comprise a plurality of quantization parameters corresponding to the actual quantization parameters for each macroblock of an intra frame.

Quality estimation module 506 may use group of pictures (GOP) size, quantization parameter values, relative frame and macroblock sizes, macroblock modes and transform coefficients to estimate picture and scene complexity. These parameters may be used to determine the perceptual visibility of artifacts. This complexity estimate can be used to modulate a Visual Quality indicator, which can be increased for more complex scenes and decreased for less complex scenes. In general, higher scene complexity results in less noticeable compression artifacts, as the spatio-temporal complexity may mask some artifacts. Therefore, even for the same QP value, more complex scenes may result in a higher MOS score than less complex scenes.

In some cases, not every intra frame in a media stream must be parsed. For example, quality can be averaged or extrapolated based on a sampling of intra frames. In addition, in some cases, intra frames may only be partially parsed, for example if a region of interest is specified. Generally, the purpose of parsing only some intra frames or partially parsing intra frames is to reduce the required computational complexity.

In some cases, the quality factor determined by analyzing only intra frames can be extended to non-intra frames by, for example, using a weighted average, or by using the average (or extrapolated) QP for each frame type multiplied by the proportion of frames of each type.

Finally, score estimation module 508 may compute a PQS based on the estimated visual quality and, optionally, stream parameters such as device display size, screen resolution and region of interest.

While slightly more computationally complex than the first, low complexity mode, the medium complexity mode of video PQS module 400 is still relatively low complexity while improving PQS accuracy. Moreover, as various video characteristics, such as macroblock modes and sizes are considered, both content difficulty and encoder quality can be reflected in the PQS, given an encoder that does not generate frames with a large difference in relative quality between intra and inter frames. Improved PQS accuracy may also depend on a reasonable frequency of intra frames in the media stream.

Figure 8:
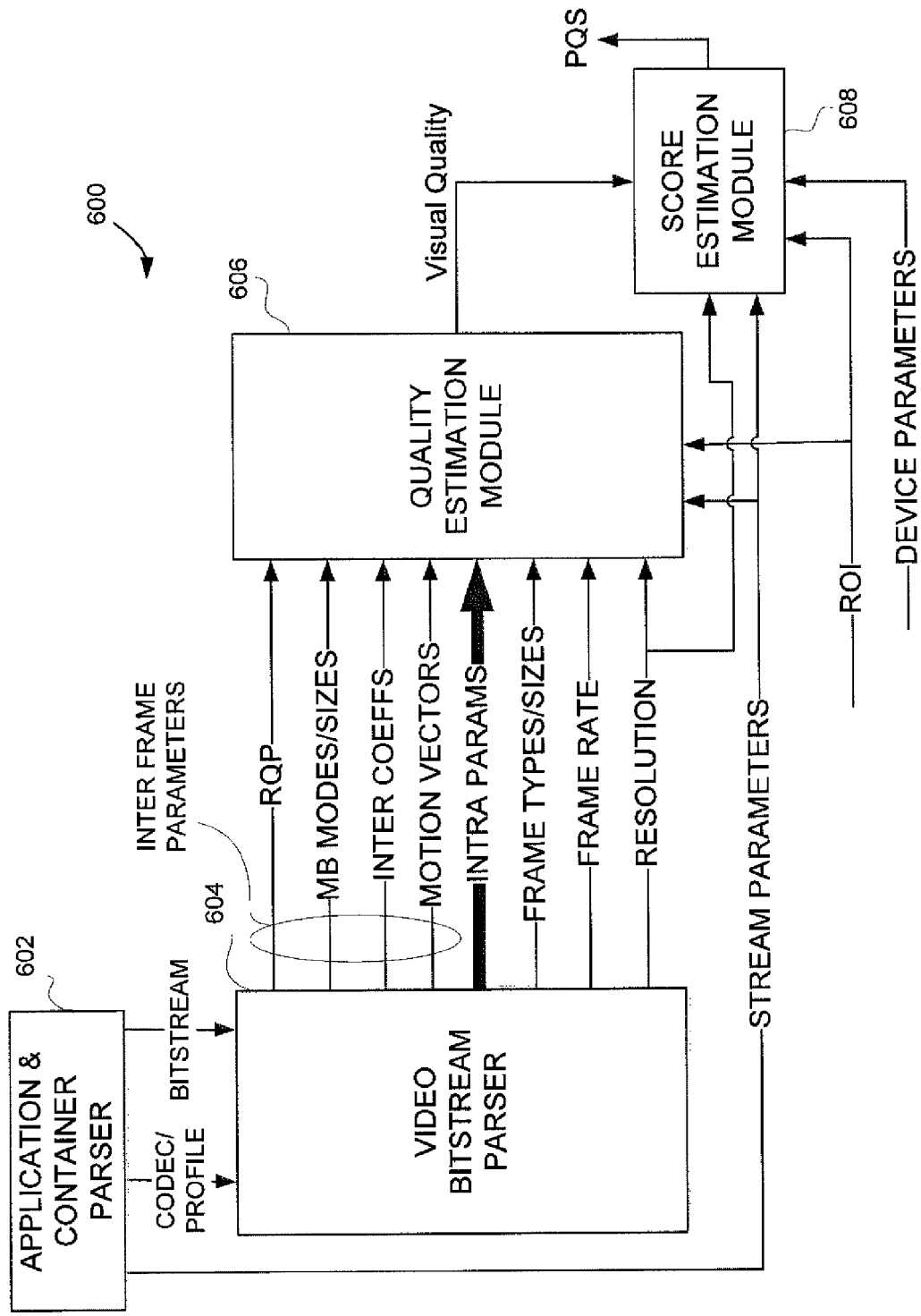
FIG. 8 is an exemplary block diagram of a PQS module operating in a third, medium-complexity analysis mode.

Referring now to FIG. 8, there is shown an exemplary block diagram of a PQS module 600 operating in a third, medium-complexity analysis mode.

As with the second analysis mode, the third analysis mode may be used, for example, if the content of a media stream can be decoded, or if computational or network load enable selection of the medium complexity analysis mode. In some embodiments, the third analysis mode may comprise some or all of the first or second analysis modes.

PQS module 600 is generally analogous to PQS module 500. However, in contrast to video bitstream parsing module 504, video bitstream parsing module 604 is further configured to parse and analyze inter frames, such as predictive and bi-predictive frames (P frame and B frames). Similarly, quality estimation module 606 is configured to analyze the inter frames in addition to intra frames when generating an estimated visual quality.

Accordingly, PQS module 600 can determine, for all frame types, one or more intra or inter frame coding parameters, such as coefficient quantizer step size or actual quantization parameter (QP), macroblock modes, intra frame prediction modes, inter frame prediction modes, bits per macroblock, coded block pattern values, coded transform coefficients (e.g., number and value), motion compensation modes, coded motion vector difference and reconstructed motion vectors.

As in PQS module 500, not every frame must be parsed to achieve a reliable estimate. Frames can be sampled based on some periodicity, indicators of changes in content complexity, or both. Quality can be extrapolated to non-parsed frames from those that are parsed.

Frames may also be parsed only partially, limiting the scope to some region of interest.

Figure 9:
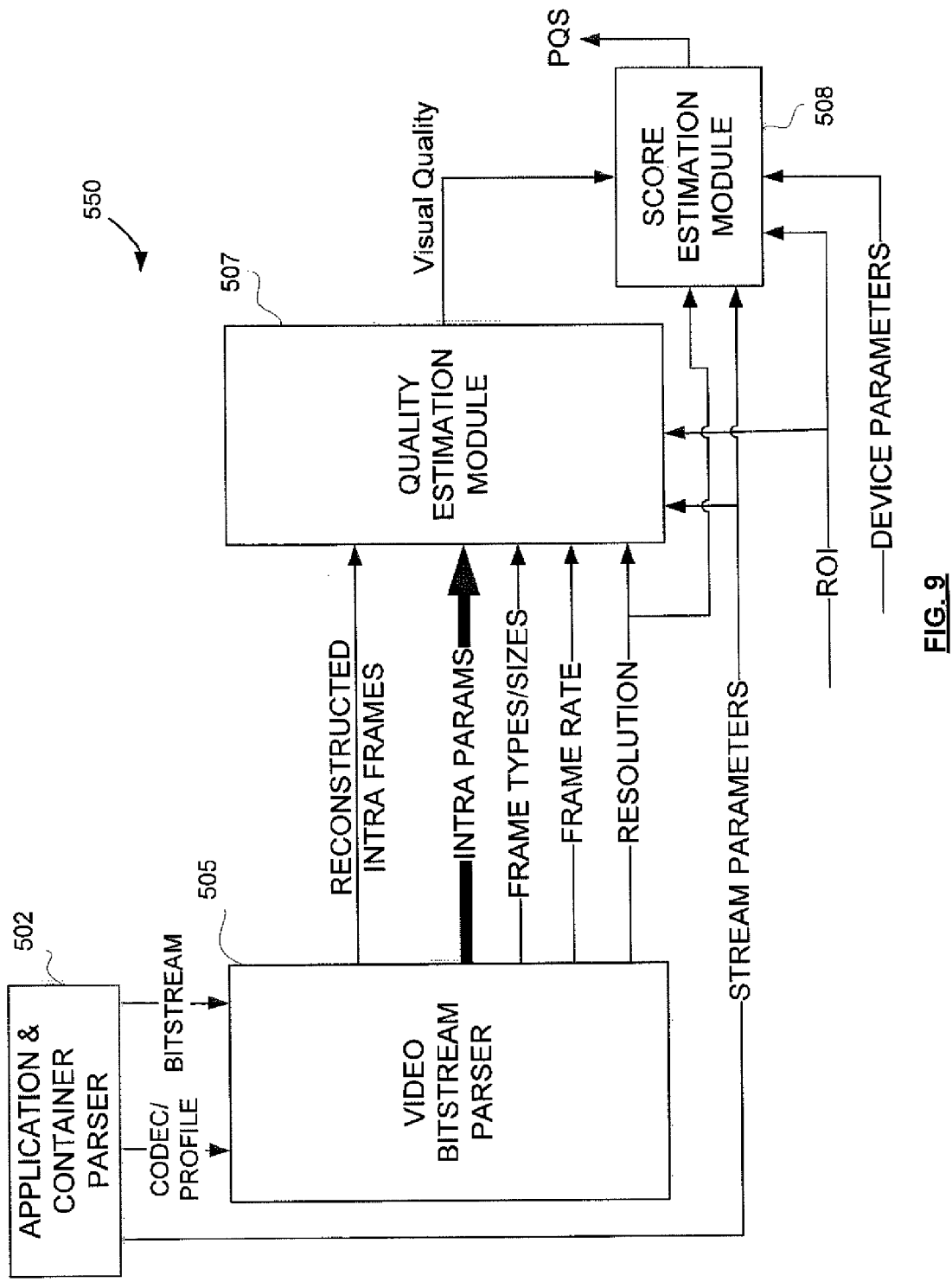
FIG. 9 is an exemplary block diagram of a PQS module operating in a fourth, high-complexity analysis mode.

Referring now to FIG. 9, there is shown an exemplary block diagram of a PQS module 550 operating in a fourth, high-complexity analysis mode.

A high-complexity mode may be used, for example, if the content of a media stream can be decoded, or if computational or network load enable selection of the high complexity analysis mode. In some embodiments, the fourth analysis mode may comprise some or all of the second analysis mode (including some or all of the first analysis mode) and, optionally, the third analysis mode.

PQS module 550 is generally analogous to PQS module 500. However, in contrast to video bitstream parsing module 504, video bitstream parsing module 505 is further configured to decode and reconstruct the intra frames, by performing inverse quantization and transformation to obtain a residual image. Either a residual image or a fully reconstructed image may be obtained, depending on the desired degree of computational effort. The reconstruction of intra frames may be computationally expensive.

The structure of the residual and reconstructed image data can be analyzed by quality estimation module 507 to refine video quality and complexity estimates. In particular, it can be used to detect and account for various spatial artifacts such as noise, blocking and ringing Accordingly, quality estimation module 507 is configured to analyze the reconstructed intra frames when generating an estimated visual quality.

Accordingly, the fourth analysis mode may improve the estimate PQS based on data that can be extracted by reconstructing the residual image data of intra frames.

In some embodiments, the fourth analysis mode may be further subdivided into sub-modes. For example, a first sub-mode may only analyze residual images, whereas a second sub-mode may analyze both residual and reconstructed images. Both modes enable the detection of spatial complexity and artifacts. However, the second sub-mode is a higher complexity mode yielding higher accuracy.

Figure 10:
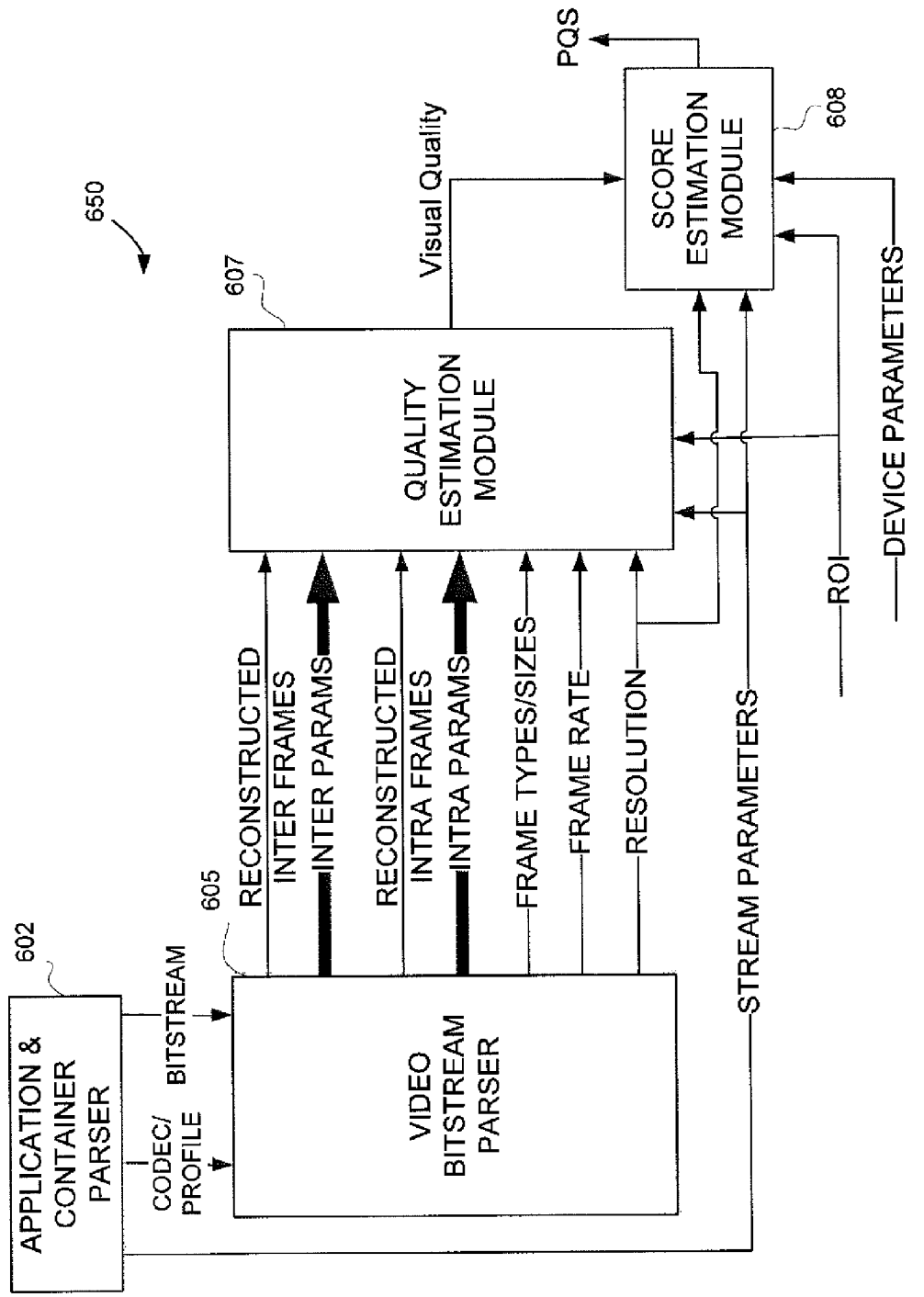
FIG. 10 is an exemplary block diagram of a PQS module operating in a fifth, high-complexity analysis mode.

Referring now to FIG. 10, there is shown an exemplary block diagram of a PQS module 650 operating in a fifth, high-complexity analysis mode.

As with the fourth analysis mode, the fifth analysis mode may be used, for example, if the content of a media stream can be decoded, or if computational or network load enable selection of the high complexity analysis mode. In some embodiments, the fifth analysis mode may comprise some or all of the first, second, third or fourth analysis modes.

PQS module 650 is generally analogous to PQS module 550. However, in contrast to video bitstream parsing module 505, video bitstream parsing module 605 is further configured to parse, analyze, decode and reconstruct inter frames, such predictive and bi-predictive frames (P frame and B frames). Similarly, quality estimation module 607 is configured to analyze the inter frames in addition to intra frames when generating an estimated visual quality.

Accordingly, PQS module 650 can determine, for all frame types, one or more intra or inter frame coding parameters. Intra frame coding parameters may include parameters such as coefficient quantizer step size or actual quantization parameter (QP), macroblock modes, intra frame prediction modes, bits per macroblock, coded block pattern values, coded transform coefficients (e.g., number and value). Inter frame coding parameters may include each of the intra frame coding parameters and, in addition, may include parameters such as inter frame prediction modes, motion compensation modes, coded motion vector difference and reconstructed motion vectors.

Furthermore, video bitstream parsing module 605 is further configured to decode and reconstruct both intra and inter frames, by performing inverse quantization and transformation to obtain a residual image. Either a residual image or a fully reconstructed image may be obtained, depending on the desired degree of computational effort. The reconstruction of intra frames may be computationally expensive.

As in the fourth analysis mode, the fifth analysis mode may be further subdivided into sub-modes. For example, a first sub-mode may only analyze residual images, whereas a second sub-mode may analyze both residual and reconstructed images. Both modes enable the detection of spatial complexity and artifacts. However, the second sub-mode is a higher complexity mode yielding higher accuracy.

In general, there may be five different types of data associated with each of the analysis modes. Each higher level analysis mode may introduce a new type of data to be analyzed, where each new type of data is generally more complex than that used in a lower level analysis mode. However, each higher level analysis mode can continue to use data types used by lower level analysis modes.

Accordingly, processing can begin based on lowest complexity data and incrementally increase to the highest complexity data.

Although five analysis modes are described herein, there may be intermediate data analysis modes that can be formed by combining the types of data considered by various analysis modes. In general, the dependencies between modes can be summarized as follows: all analysis modes will use container layer information, intra-frame reconstruction relies upon intra-frame parsing and inter-frame reconstruction relies upon inter-frame parsing and intra-frame reconstruction (which itself requires intra-frame parsing).

Table 2 sets out the data used by the exemplary modes and combinations of modes:

TABLE 2

| Data Sources | Mode | | | | | | |
|---|---|---|---|---|---|---|---|
| | 1 | 2 | 3 | 3b | 4 | 4b | 5 |
| Container Layer | Yes | Yes | Yes | Yes | Yes | Yes | Yes |
| Intra Parsing | No | Yes | Yes | No | Yes | Yes | Yes |
| Inter Parsing | No | No | Yes | Yes | Yes | No | Yes |
| Intra Reconstruction | No | No | No | No | Yes | Yes | Yes |
| Inter Reconstruction | No | No | No | No | No | No | Yes |

Accordingly, intermediate modes, labeled as modes 3b and 4b in Table 2, may be provided.

In mode 3b, inter frames may be parsed, but not intra frames. In practice, this mode may be less desirable, at least because the elements of infra frames are a subset of intra frames. Accordingly, when parsing for inter frame data there is little advantage to discarding intra frame data.

In mode 4b, intra frames may be reconstructed, but inter frames ignored. This mode may be useful in some cases, because it allows for obtaining additional information from reconstructing only intra frames, without the need for implementing any of the features that are specific to inter frames.

Accordingly, the dependencies may be summarized briefly as follows. The second analysis mode may make use of data available in the first analysis mode. The third analysis mode may make use of data available in the first analysis mode, and optionally the additional data that was available in the second analysis mode (e.g., intra-frame parsing). The fourth analysis mode may make use of data available in the first analysis mode and the second analysis mode, and optionally the additional data that was only available in the third analysis mode (e.g., inter-frame parsing). The fifth analysis mode may make use of data available in all of the other modes.

Referring now to FIG. 11, there is shown an exemplary block diagram of an audio PQS module 700.

PQS module 700 is generally analogous to audio PQS module 134 of PQS module 114, and comprises an application and container parsing module 702, a quality estimation module 706 and a score estimation module 708.

PQS module 700 operates in a low complexity analysis mode that is generally analogous to the first, low-complexity mode of video PQS module 300. However, as with video PQS modules, other higher complexity modes are possible. For example, an audio PQS module may implement partial or full parsing, with partial or full reconstruction of audio frames.

Application and container parsing module 702 can determine media stream characteristics such as an audio codec & profile, coding features, bit rate, sampling frequency, number of channels, and the like.

Output PQS values in each of the above-described embodiments can generally correspond to a level of viewer or listener satisfaction with the presentation of the media stream.

PQS values can be normalized to take into account characteristics of the playback device and coding format of the media data. PQS values may be computed throughout a media session. In some cases, a final PQS can provided, which may incorporate an optional memory model to reflect recency effects.

Audio and video PQS values may be computed and presented separately, or as a combined score that represents the resulting quality of experience based on the presentation of both media types.

In some cases, partially-computed PQS values may be cached, for example, when system load increases necessitating a change of analysis mode. The partially-computed PQS values may be retrieved when the analysis mode is resumed for the media session.

Similarly, computed PQS values may be cached for reuse if or when a particular content is delivered again. Accordingly, PQS accuracy may be improved over time by, for example, parsing different frames (sampled at different points) the next time the same content is transmitted, and using the combined information from both media sessions to generate the score for the second and subsequent media sessions.

While particular combinations of various functions and features have been expressly described herein, other combinations of these features and functions are possible that are not limited by the particular examples disclosed herein are expressly incorporated within the scope of the present invention. In particular, various aspects have been described herein with specific reference to video embodiments, however the described methods, systems and apparatus may also be applied to audio embodiments.

As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled".

As the term module is used in the description of the various embodiments, a module includes a functional block that is implemented in hardware, software, and/or firmware that performs one or more functions such as the processing of an input signal to produce an output signal. As used herein, a module may contain submodules that themselves are modules.

The present invention has been described here by way of example only. Various modification and variations may be made to these exemplary embodiments without departing from the spirit and scope of the invention, which is limited only by the appended claims.

We claim:

1. A method of providing a presentation quality score for a media stream, the media stream transmitted in a media streaming session from a transmitting device to a receiving device, the method comprising:
   prior to decoding the media stream, parsing a container of the media stream to determine at least one media stream characteristic;
   determining a system resource availability;
   selecting an analysis mode for the media streaming session based on the system resource availability, wherein the analysis mode is selected from a plurality of analysis modes available for selection, wherein, in at least one of the plurality of analysis modes, a video bitstream of the media stream is not parsed into a macroblock layer, and wherein, in at least one other of the plurality of analysis modes, the video bitstream is parsed into the macroblock layer; and
   determining the presentation quality score using the selected analysis mode.

2. The method of claim 1, wherein the presentation quality score is determined based on at least one device parameter.

3. The method of claim 1, further comprising estimating a visual quality factor based on the at least one media stream characteristic, wherein the presentation quality score is determined based on the visual quality factor.

4. The method of claim 1, further comprising determining a representative quantization parameter for at least one frame of the media stream based on the at least one media stream characteristic.

5. The method of claim 3, further comprising parsing the video bitstream of the media stream to identify at least one intra frame, wherein the visual quality factor is estimated based on at least one intra frame coding parameter of the at least one intra frame.

6. The method of claim 5, wherein the at least one intra frame coding parameter is selected from the group consisting of macroblock mode, coded macroblock size in bits, macroblock quantization parameter, transform coefficient size, transform coefficient distribution, frame size, frame rate and resolution.

7. The method of claim 5, further comprising decoding the at least one intra frame, wherein the visual quality factor is estimated based on the at least one decoded intra frame.

8. The method of claim 5, further comprising parsing the video bitstream to identify at least one inter frame of the media stream, wherein the visual quality factor is estimated based on at least one inter frame coding parameter of the at least one inter frame.

9. The method of claim 8, wherein the at least one inter frame coding parameter is selected from the group consisting of macroblock mode, coded macroblock size in bits, macroblock quantization parameter, motion compensation mode, motion vector magnitude, transform coefficient size, transform coefficient distribution and coded frame size.

10. The method of claim 9, further comprising decoding the at least one inter frame, wherein the visual quality factor is estimated based on the at least one decoded inter frame.

11. An apparatus for providing a presentation quality score for a media stream, the media stream transmitted in a media streaming session from a transmitting device to a receiving device, the apparatus comprising:
- a memory; and
- at least one processor, the at least one processor configured to execute:
  - a container parsing module configured to parse a container of the media stream to determine at least one media stream characteristic;
  - an analysis mode selection module configured to determine a system resource availability, and to select an analysis mode for the media streaming session based on the system resource availability, wherein the analysis mode is selected from a plurality of analysis modes available for selection;
  - a quality estimation module configured to compute an estimated quality of the media stream, wherein, in at least one of the plurality of analysis modes, a video bitstream of the media stream is not parsed into a macroblock layer, and wherein, in at least one other of the plurality of analysis modes, the video bitstream is parsed into the macroblock layer; and
  - a score estimation module configured to determine the presentation quality score using the selected analysis mode.

12. The apparatus of claim 11, wherein the presentation quality score is determined based on at least one device parameter.

13. The apparatus of claim 11, wherein the quality estimation module is configured to estimate a visual quality factor based on the at least one media stream characteristic, wherein the presentation quality score is determined based on the visual quality factor.

14. The apparatus of claim 11, wherein a representative quantization parameter is determined for at least one frame of the media stream based on the at least one media stream characteristic.

15. The apparatus of claim 13, wherein the quality estimation module is further configured to parse the video bitstream of the media stream to identify at least one intra frame, wherein the visual quality factor is estimated based on at least one intra frame coding parameter of the at least one intra frame.

16. The apparatus of claim 15, wherein the at least one intra frame coding parameter is selected from the group consisting of macroblock mode, coded macroblock size in bits, macroblock quantization parameter, transform coefficient size, transform coefficient distribution, frame size, frame rate and resolution.

17. The apparatus of claim 15, wherein the quality estimation module is further configured to decode the at least one intra frame, wherein the visual quality factor is estimated based on the at least one decoded intra frame.

18. The apparatus of claim 15, wherein the quality estimation module is further configured to parse the video bitstream to identify at least one inter frame of the media stream, wherein the visual quality factor is estimated based on at least one inter frame coding parameter of the at least one inter frame.

19. The apparatus of claim 18, wherein the at least one inter frame coding parameter is selected from the group consisting of macroblock mode, coded macroblock size in bits, macroblock quantization parameter, motion compensation mode, motion vector magnitude, transform coefficient size, transform coefficient distribution and coded frame size.

20. The apparatus of claim 19, wherein the quality estimation module is further configured to decode the at least one inter frame, wherein the visual quality factor is estimated based on the at least one decoded inter frame.

* * * * *